United States Patent
Park

(10) Patent No.: US 9,952,994 B2
(45) Date of Patent: Apr. 24, 2018

(54) INTEGRATED MULTIMEDIA TERMINAL SYSTEM AND CONTROL METHOD THEREOF

(71) Applicant: Hyundai Motor Company, Seoul (KR)

(72) Inventor: Sung Jun Park, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 325 days.

(21) Appl. No.: 14/476,450

(22) Filed: Sep. 3, 2014

(65) Prior Publication Data

US 2015/0186315 A1    Jul. 2, 2015

(30) Foreign Application Priority Data

Dec. 27, 2013  (KR) .......................... 10-2013-0165252

(51) Int. Cl.
  *G06F 13/00*    (2006.01)
  *G06F 13/38*    (2006.01)
  *G06F 13/20*    (2006.01)
  *G06F 13/40*    (2006.01)

(52) U.S. Cl.
  CPC ............ *G06F 13/385* (2013.01); *G06F 13/20* (2013.01); *G06F 13/4068* (2013.01)

(58) Field of Classification Search
  CPC .............................. G06F 13/385; G06F 13/20
  USPC ...................................................... 710/301
  See application file for complete search history.

(56) References Cited

U.S. PATENT DOCUMENTS

| | | | | |
|---|---|---|---|---|
| 6,735,720 B1* | 5/2004 | Dunn | ................... | G06F 11/0745 714/43 |
| 8,473,012 B2* | 6/2013 | Varela | ..................... | B60K 37/06 455/556.1 |
| 8,819,301 B2* | 8/2014 | Lai | ........................ | H02J 7/0004 710/10 |
| 2003/0054703 A1* | 3/2003 | Fischer | ................. | H02J 7/0027 439/894 |

(Continued)

FOREIGN PATENT DOCUMENTS

JP    11-282769    10/1999
KR    10-0850038    7/2008

(Continued)

OTHER PUBLICATIONS

Universal Serial Bus Specification Revision 2.0 Apr. 27, 2000.*

*Primary Examiner* — Paul R Myers
(74) *Attorney, Agent, or Firm* — Mintz Levin Cohn Ferris Glovsky and Popeo, P.C.; Peter F. Corless

(57) ABSTRACT

An integrated multimedia system and a control method are provided, in which, when a USB port is reset during a misrecognition and malfunction of a USB connected to a port of an integrated multimedia terminal integrally provided with an SD slot, an SD slot is prevented from being reset to improve the stability and quality of an AVN system. The system includes an integrated multimedia terminal including a USB port for electrical connection of a USB and an SD slot for electrical connection of an SD card. An audio video navigation (AVN) controller detects the SD card and the USB, obtains data of the SD card and the USB and is connected to the integrated multimedia terminal. A hub electrically connects the SD slot and the USB port to the AVN controller and an auxiliary controller operates the USB port in response to a control signal transmitted via the hub.

6 Claims, 4 Drawing Sheets

(56) References Cited

U.S. PATENT DOCUMENTS

| | | | |
|---|---|---|---|
| 2004/0076048 A1* | 4/2004 | Kabenjian | G06F 13/409 365/200 |
| 2006/0248257 A1* | 11/2006 | Kojima | G06F 1/266 710/316 |
| 2007/0008403 A1* | 1/2007 | Huang | H04N 19/42 348/14.04 |
| 2007/0088967 A1* | 4/2007 | Fu | G06F 1/266 713/340 |
| 2008/0039007 A1* | 2/2008 | Wu | H04W 88/08 455/3.01 |
| 2009/0131036 A1* | 5/2009 | Liang | H04M 1/72527 455/422.1 |
| 2009/0292826 A1* | 11/2009 | Wong | G06F 3/0605 710/5 |
| 2010/0332703 A1* | 12/2010 | Ejiri | G06F 17/30082 710/104 |
| 2011/0016267 A1* | 1/2011 | Lee | G06F 13/28 711/103 |
| 2011/0161530 A1* | 6/2011 | Pietri | G06F 13/4022 710/14 |
| 2011/0161531 A1* | 6/2011 | Katayama | G06F 3/1211 710/14 |
| 2011/0179201 A1* | 7/2011 | Monks | G06F 13/387 710/60 |
| 2011/0231672 A1* | 9/2011 | Idani | G06F 21/6218 713/189 |
| 2014/0050331 A1* | 2/2014 | Choi | G06F 13/385 381/86 |
| 2015/0089092 A1* | 3/2015 | Voto | G06F 13/385 710/14 |
| 2015/0331823 A1* | 11/2015 | Jang | G05B 19/05 710/300 |

FOREIGN PATENT DOCUMENTS

| | | |
|---|---|---|
| KR | 10-2012-0035265 A | 4/2012 |
| KR | 10-1231599 B1 | 2/2013 |
| KR | 10-1282305 | 6/2013 |
| KR | 10-2013-0107500 | 10/2013 |

* cited by examiner

INTEGRATED MULTIMEDIA TERMINAL SYSTEM AND CONTROL METHOD THEREOF

CROSS-REFERENCE TO RELATED APPLICATION

This application claims under 35 U.S.C. § 119(a) the benefit of Korean Patent Application No. 10-2013-0165252 filed on Dec. 27, 2013, the entire contents of which are incorporated herein by reference.

BACKGROUND (a) Technical Field

The present invention relates to an integrated multimedia terminal system and a control method thereof. More particularly, the present invention relates to an integrated multimedia terminal system and a control method thereof, which improve the stability and quality of an audio video navigation (AVN) system by preventing a secure digital (SD) card from being reset when misrecognition and malfunction of a universal serial bus (USB) occurs.

(b) Background Art

An audio video navigation (AVN) system is a system that provides passengers with information related to audio, video and navigation systems to guarantee driver's convenience. In a currently developed AVN system, map data is stored in an SD card, and a customer replaces only the SD card when the AVN system is updated, thereby reducing update time and providing convenience. However, the SD card is disposed within the AVN system and used only when updating the AVN system (the average number of updating the AVN system: four times per year).

Meanwhile, FIG. 1 illustrates a conventional multimedia terminal system according to the related art. Referring to FIG. 1, the conventional multimedia terminal system includes a multimedia terminal 1 having a USB port 2 for electrically connecting a USB to the multimedia terminal 1 by inserting the USB thereinto, and an AVN controller 3 configured to transmit a data of the USB to an AVN system in the connection of the USB to the multimedia terminal 1.

In the conventional multimedia terminal system, the AVN controller 3 is configured to detect connection of the USB in the connection of the USB to the multimedia terminal and control an operation for using a data of the USB. However, in response to determining that misrecognition and malfunction of the USB occurs in the connection of the USB to the multimedia terminal 1 (e.g., when misrecognition and malfunction of the USB occurs) due to the communications occurred between the AVN system and the multimedia terminal 1 in the connection of the USB to the USB port 2 of the multimedia terminal 1, the AVN controller 3 is configured to operate the USB to be reconnected by disconnecting and then reconnecting the system connection of a Vbus of the USB.

Therefore, when an SD slot (e.g., SD card insertion portion) is integrated with the multimedia terminal, the system connection up to an SD card may be disconnected and then reconnected when malfunction and misrecognition of the USB occurs in the use of the USB. As a result, the AVN system is rebooted by re-recognizing a navigation map data of the SD card, thereby lowering the quality of the AVN system.

SUMMARY

The present invention provides an integrated multimedia system and a control method thereof, in which, when a USB port may be reset based on the occurrence of misrecognition and malfunction of a USB connected to a port of an integrated multimedia terminal integrally provided with an SD slot, it may be possible to prevent an SD slot from being reset together with the USB port, thereby improving the stability and quality of an AVN system.

In one aspect, the present invention provides an integrated multimedia terminal system that may include: an integrated multimedia terminal configured to have a USB port for electrical connection of a USB and an SD slot for electrical connection of an SD card; an audio video navigation (AVN) controller configured to recognize the SD card and the USB, connected to the integrated multimedia terminal, and obtain data of the SD card and the USB; a hub configured to electrically connect the SD slot and the USB port to the AVN controller; and an auxiliary controller configured to operate the USB port in response to a control signal of the AVN controller, transmitted via the hub by connecting between the hub and the USB port.

In an exemplary embodiment, when transmitting a reset command signal for resetting the USB port to the hub, the AVN controller may be configured to transmit the reset command signal received by the hub to the auxiliary controller. In another exemplary embodiment, the auxiliary controller may be configured to reset the USB port to which the USB is connected in response to the reset command signal of the AVN controller, transmitted via the hub.

In another aspect, the present invention provides a method of controlling an integrated multimedia terminal system that may include: connecting a USB to a USB port of an integrated multimedia terminal; determining whether the USB port is activated; transmitting a reset command signal for resetting the USB port to an auxiliary controller via a hub when the USB port is not activated; and activating the USB port by supplying a bus voltage to the USB port in response to the reset command signal that the auxiliary controller receives via the hub.

In an exemplary embodiment, the reset command signal for resetting the USB port may be transmitted to the hub, and simultaneously, the reset command signal received by the hub may be transmitted to the auxiliary controller. In another exemplary embodiment, the auxiliary controller may be connected between the hub and the USB port to independently operate the USB port separately from the SD slot provided to the integrated multimedia terminal.

As described above, the integrated multimedia terminal system according to the present invention have advantages as follows.

First, it may be possible to prevent map data of the SD card from being cut off even in the occurrence of misrecognition and malfunction of the USB. Thus, the map data may be more stably transmitted to the AVN system, thereby improving the performance and stability of the AVN system.

Second, the integrated multimedia terminal integrally provided with the SD slot for connection of the SD card may be used, and thus, it may be possible to increase the degree of freedom of design and to secure a space.

Third, the integrated multimedia terminal may be disposed at a position such as a lower end of a center fascia (e.g., front console) within a vehicle, where the integrated multimedia terminal is not visible and thus, it may be possible to improve the internal design of the vehicle and to prevent loss of the SD card in advance.

Fourth, it may be possible to omit a substantially high-priced cable for an SD slot, and the like, which are used for connection between the SD slot and the AVN system, thereby reducing unit cost.

BRIEF DESCRIPTION OF THE DRAWINGS

The above and other features of the present invention will now be described in detail with reference to exemplary embodiments thereof illustrated the accompanying drawings which are given hereinbelow by way of illustration only, and thus are not limitative of the present invention, and wherein.

Figure 1:
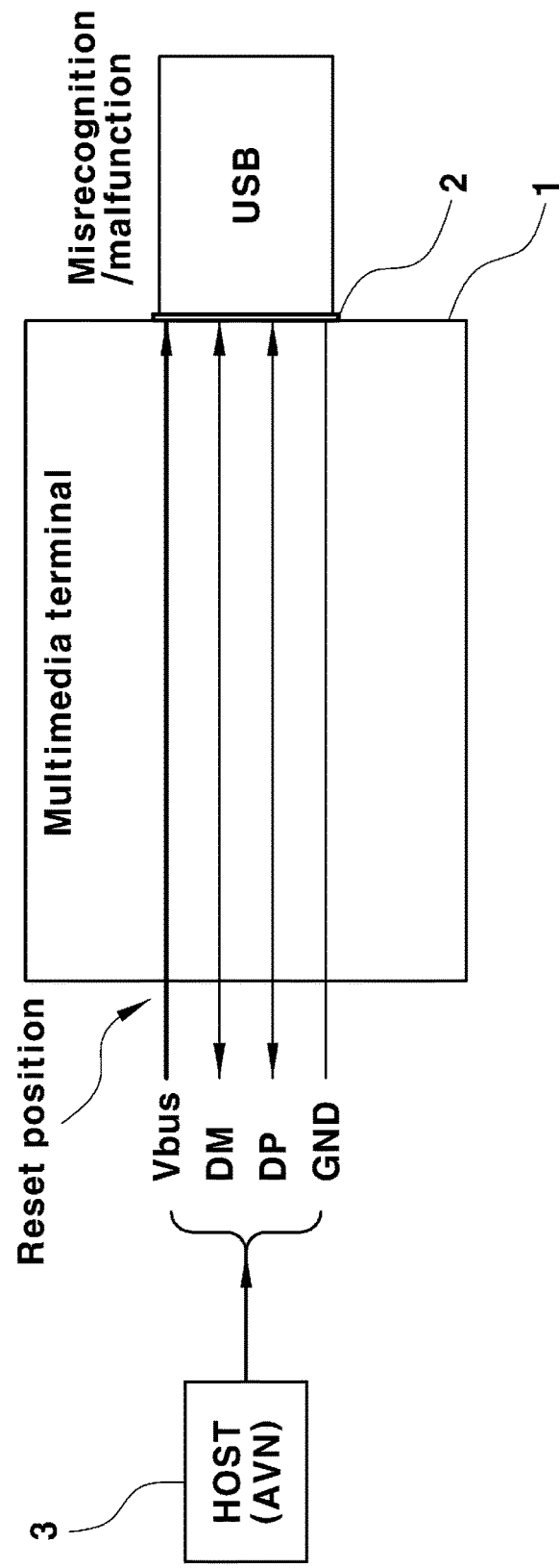
FIG. 1 illustrates an exemplary conventional multimedia terminal system according to the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter reference will now be made in detail to various exemplary embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Figure 2:
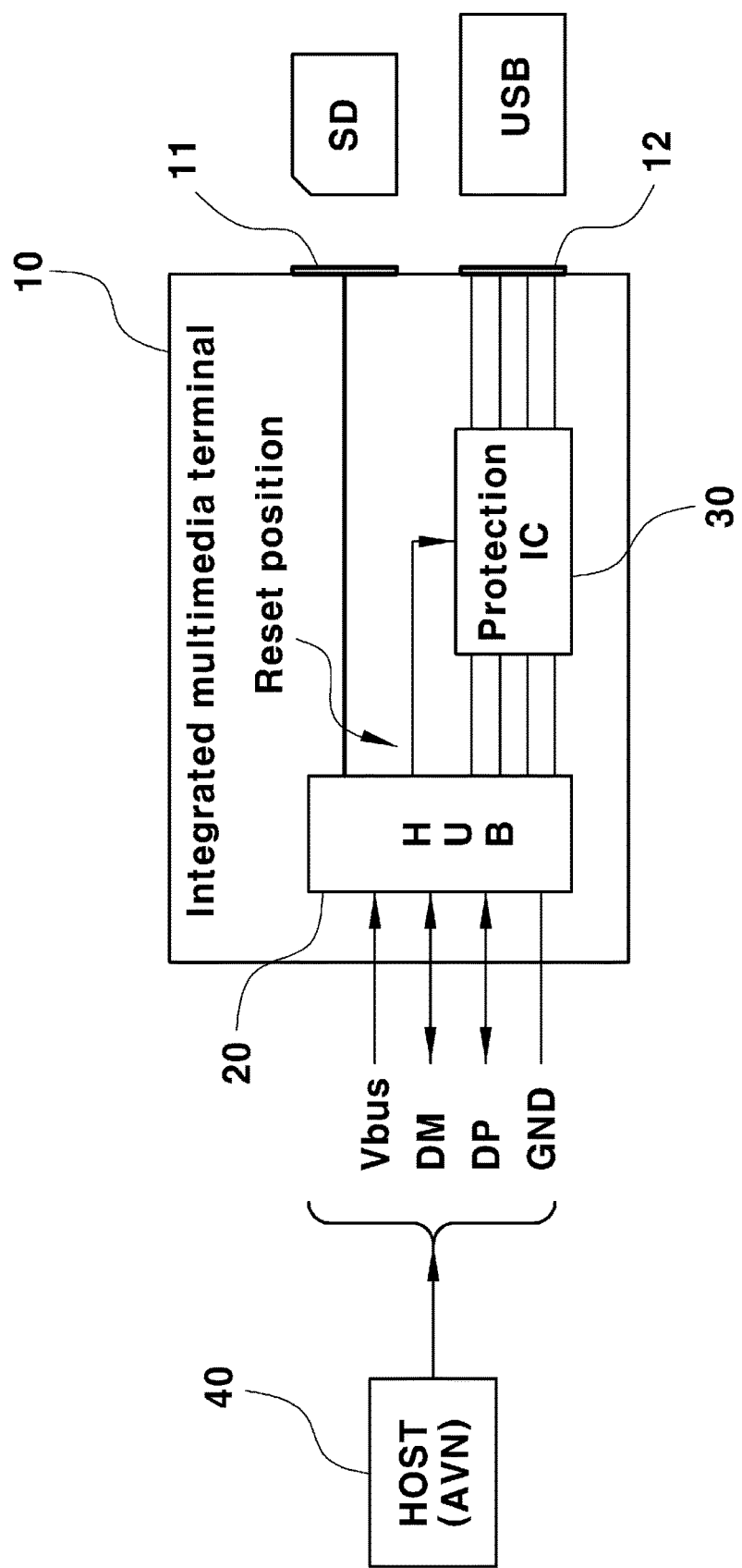
FIG. 2 illustrates an exemplary integrated multimedia terminal system according to an exemplary embodiment of the present invention.
Figure 3:
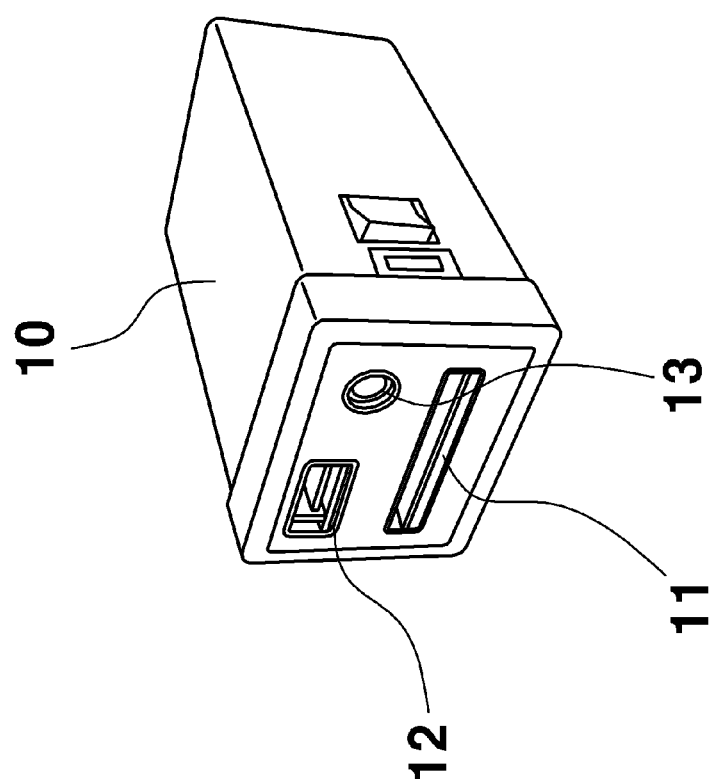
FIG. 3 illustrates an exemplary integrated multimedia terminal according to the exemplary embodiment of the present invention.

As shown in FIG. 2, the integrated multimedia terminal system according to the exemplary embodiment of the present invention configured to include an integrated multimedia terminal 10, a hub 20 and an auxiliary controller 20 and 30, which may be disposed within the integrated multimedia terminal 10, and an audio video navigation (AVN) controller 40. As shown in FIG. 3, the integrated multimedia terminal 10 may be a multimedia terminal integrally provided with an SD slot 11 for connection of an SD card, and may include a USB port 12 for electrical connection of a USB, the SD slot 11 for electrical connection of the SD card, and an auxiliary input/output terminal 13 for a preliminary input/output.

When the USB port 12 and the SD slot 11 are activated by the AVN controller 40 in the connection of an external memory device such as a USB or SD card to the integrated multimedia terminal 10, the integrated multimedia terminal 10 may be configured to provide data of the USB and the SD card to the AVN controller 40. In particular, the data of the USB and the data of the SD card may be simultaneously transmitted. In other words, the integrated multimedia terminal 10 may be configured to provide the data of the USB and the SD card to the AVN controller 40 via the USB port 12 and the SD slot 11.

The hub 20 is a connection device for electrical signal connection between the integrated multimedia terminal 10 and the AVN controller 40. The hub 20 may be configured within the integrated multimedia terminal 10 to enable each of the SD card and the USB, connected to the integrated multimedia terminal 10, to transmit signals to the AVN controller 40. When receiving a signal from the AVN controller 40, the hub 20 may be configured to transmit the received signal to the USB port 12 or the SD slot 11 under a command of the AVN controller 40. In other words, when transmitting a signal to the hub 20, the AVN controller 40 may be configured to determine an object to which the signal received by hub 20 is to be transmitted.

The USB port 12 and the SD slot 11 may be electrically connected to ports disposed within the hub 20, respectively, and the hub 20 may include a port for connection of the auxiliary input/output terminal 13. When an external device is connected to the auxiliary input/output terminal 13 of the integrated multimedia terminal 10, the hub 20 may be configured to connect the auxiliary input/output terminal 13 and the AVN controller 40 to transmit signals to each other.

The auxiliary controller 30 may be used to independently operate the USB port 12 of the integrated multimedia terminal 10, separately from the SD. The auxiliary controller 30 may be disposed within the integrated multimedia terminal 10 to be connected to the hub 20, to allow signals to be transmitted between the auxiliary controller 30 and the hub 20. The auxiliary controller 30 may be configured to operate the USB port 12 in response to the control signal of the AVN controller 40, transmitted from the hub 20.

The auxiliary controller 30 may be connected between the hub 20 and the USB port 12, to operate the USB port 12 by receiving the control signal generated in the AVN controller 40 via the hub 20. The AVN controller 40 may be configured to obtain a data stored in an external memory device connected to the integrated multimedia terminal 10 and operate a corresponding device (e.g., a video player, audio player, etc.) using the obtained data. When the external memory device including the USB and the SD card is connected to the integrated multimedia terminal 10, the AVN controller 40 may be configured to activate the USB port 12 and the SD slot 11, thereby obtaining required data. When the external memory device is connected to the integrated multimedia terminal 10, the AVN controller 40 may be configured to transmit a signal to operate the USB port 12 and the SD slot 11 via the hub 20, and receive data of the USB and the SD card, respectively transmitted from the USB port 12 and the SD slot 11, via the hub 20.

In the integrated multimedia terminal system configured as described above, when malfunction and misrecognition occurs in connection between the integrated multimedia terminal 10 and an AVN system, the USB port 12 of the integrated multimedia terminal 10 may be reset and reactivated. Particularly, in the integrated multimedia terminal system, when misrecognition and malfunction of the USB occurs in connection of the USB to the integrated multimedia terminal 10, the USB port 12 may be reset, thereby preventing a reset of the SD slot 11.

Figure 4:
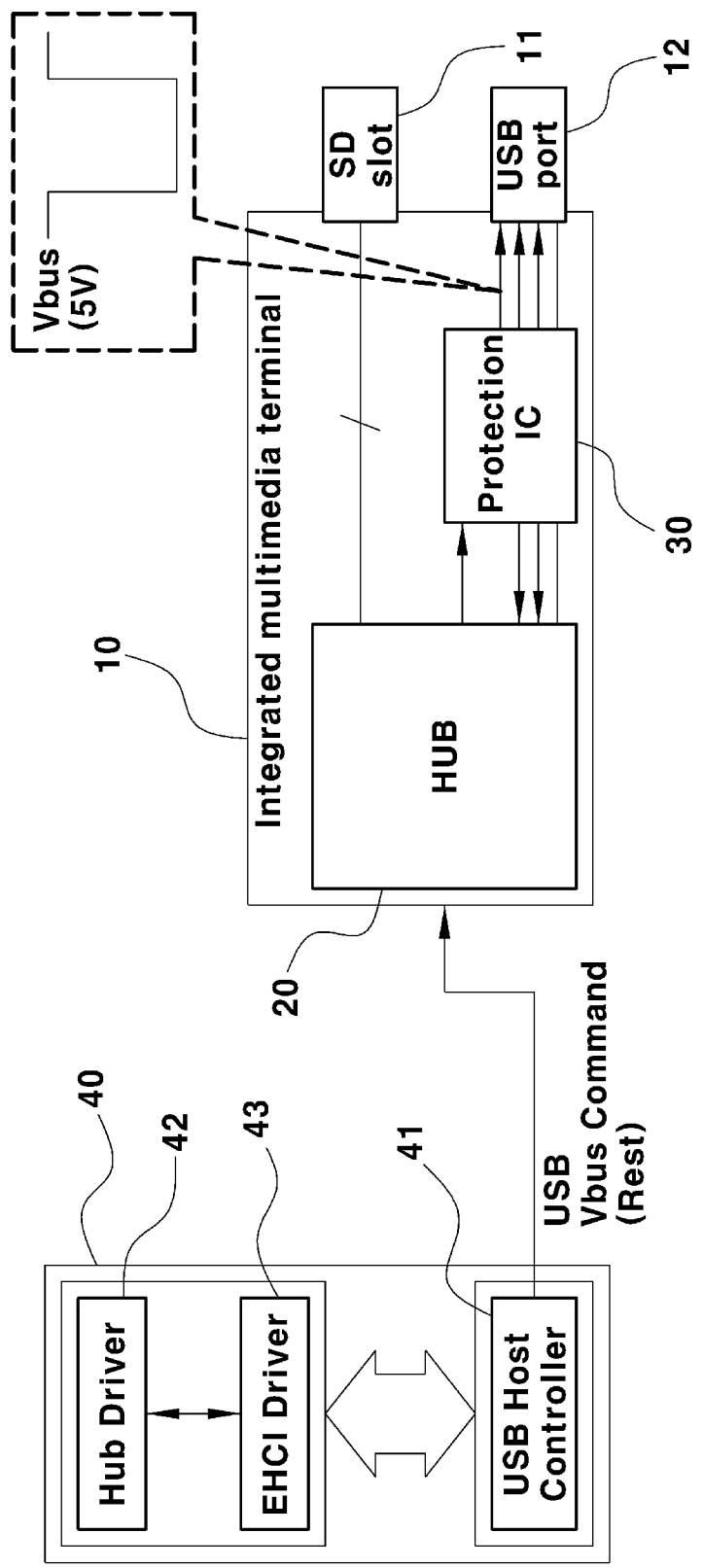
FIG. 4 illustrates an exemplary control method of the integrated multimedia terminal system according to the exemplary embodiment of the present invention.

Hereinafter, a process of controlling a reset of the integrated multimedia terminal system in the occurrence of misrecognition and malfunction of the USB will be described in detail with reference to FIG. 4.

When the USB is connected to the integrated multimedia terminal 10 by being inserted into the USB port 12 of the integrated multimedia terminal 10, the AVN controller 40 may be configured to detect the connection of the USB and generate a control signal for supplying a bus voltage to the USB port 12 to activate the USB port 12. In particular, the bus voltage supplied to the USB port 12 may be supplied to the USB, and the USB port 12 may be configured to enter an activation state in which the USB port 12 may be configured to detect the USB connected to the integrated multimedia terminal 10.

Specifically, in the process of activating the USB port 12 by supplying the bus voltage to the USB port 12, the AVN controller 40 may be configured to supply the bus voltage to the USB via Vbus and ground pins among four pins (e.g., Vbus, ground, DM and DP pins provided to the USB, to allow the USB port 12 to detect the USB. The USB port 12 may be configured to obtain data of the USB via the DM and DP pins in the activation state, and transmit the obtained data to the AVN controller 40 to operate a corresponding device of the AVN system. Thus, the obtained data may be output through an output device (e.g., a monitor, speaker, etc.).

In response to determining that misrecognition and malfunction of the USB occurs in the process of activating the USB port 12 to recognize the USB as described above, the AVN controller 40 may be configured to generate a control signal (e.g., reset command signal) for resetting the USB port 12 of the integrated multimedia terminal 10. In particular, the AVN controller 40 may be configured to reset the bus voltage (e.g., voltage for activating the USB port) supplied to the USB port 12 to reset and reactivate the USB port 12.

Particularly, the AVN controller 40 may not block the supply of the bus voltage but may be configured to reset the bus voltage. In other words, when misrecognition and malfunction of the USB occurs, the AVN controller 40 may be configured to reset the bus voltage provided via the USB port 12 and reactivate the USB port 12 to re-detect (e.g., recognize) the USB, to allow the normal detection (e.g., detection without error or malfunction) and operation of the USB. In particular, the power supplied to the USB port and the Vbus of the USB in the reset of the bus voltage may be decreased to less than a setup value (e.g., about 5V) and then recovered to the setup value.

When the AVN controller 40 generates and transmits a control signal (e.g., reset command signal) for resetting the voltage of the Vbus of the USB, the hub 20 may be configured to receive the reset command signal and transmit the received reset command signal to the auxiliary controller 30. The auxiliary controller 30 receiving the reset command signal transmitted from the hub 20 may be configured to adjust the bus voltage supplied to the USB via the USB port 12 to be reset, thereby reactivating the USB port 12.

In other words, various types of control signals which the AVN controller 40 generates to detect the USB connected to the USB port 12 and to operate the USB may be transmitted to the USB port 12 via the hub 20 and the auxiliary controller 30, to independently operate the USB port 12 separately from the SD slot 11. In particular, the SD slot 11 and the SD card connected to the SD slot 11 may be detected to be operated by various types of control signals of the AVN controller 40, transmitted via the hub 20. Specifically, the AVN controller 40 may include an USB controller 41, a hub driver 42, an enhanced host controller interface (EHCI) 43, and the like. The USB controller 41 may be configured to generate and transmit the control signal (e.g., reset command signal) for resetting the voltage of the Vbus.

The hub driver 42 may be configured to drive the hub 20. When the hub 20 receives the control signal for resetting the voltage of the Vbus, the hub driver 42 may be configured to transmit the received control signal to the auxiliary controller 30. Additionally, the EHCI driver 43 may be a USB controller interface for connecting the hub driver 42 and the USB controller 41. The EHCI driver 43 allows the hub driver 42 to detect that the USB controller 41 transmitted the reset command signal to the hub 20, to cause the USB controller 41 to transmit the reset command signal to the hub 20 and simultaneously transmit a signal received by the hub 20 to the auxiliary controller 30 under the control of the hub driver 42. As a result, the reset command signal may be transmitted to the auxiliary controller 30.

According to the integrated multimedia terminal system of the present invention, when the AVN system re-recognizes (e.g., again detects) the USB by resetting the USB port 12, the SD card may be reset to prevent the AVN system from re-recognizing a data (e.g., including a navigation map data) stored in the SD card, so that it may be possible to prevent the entire AVN system from being rebooted (e.g., when the navigation map data is re-recognized, the entire AVN system is reset), thereby ensuring the stability of the AVN system.

The invention has been described in detail with reference to exemplary embodiments thereof. However, it will be appreciated by those skilled in the art that changes may be made in these exemplary embodiments without departing from the principles and spirit of the invention, the scope of which is defined in the appended claims and their equivalents.

What is claimed is:

1. An integrated multimedia terminal system, comprising:
   an integrated multimedia terminal including a universal serial bus (USB) port for electrical connection of a USB and a secure digital (SD) slot for electrical connection of an SD card;
   an audio video navigation (AVN) controller configured to detect the SD card and the USB and obtain data of the SD card and the USB, wherein the AVN controller is connected to the integrated multimedia terminal;
   a hub configured to electrically connect the SD slot and the USB port to the AVN controller; and
   an auxiliary controller configured to reset and reactivate the USB port in response to a reset command signal for resetting the USB port received from the AVN controller, transmitted via the hub,
   wherein the auxiliary controller is connected between the hub and the USB port to independently operate the USB port separately from the SD slot,
   wherein the AVN controller is configured to receive SD data from the SD slot without conversion to USB protocols, and
   wherein the controller is configured to determine an object to which the reset command for resulting the USB port is to be transmitted.

2. The integrated multimedia terminal system of claim 1, wherein, when transmitting the reset command signal for resetting the USB port to the hub, the AVN controller is configured to transmit the reset command signal received by the hub to the auxiliary controller.

3. A method of controlling an integrated multimedia terminal system, the method comprising:
   connecting, by audio video navigation (AVN) controller, a universal serial bus (USB) to a USB port of an integrated multimedia terminal;
   determining by the AVN controller whether the USB port is activated;
   transmitting, by the AVN controller, a reset command signal for resetting the USB port to an auxiliary controller via a hub when the USB port is inactivated;
   determining, by the auxiliary controller, an object to which the reset command for resetting the USB port is to be transmitted; and
   resetting and reactivating, by the auxiliary controller, the USB port by supplying a bus voltage to the USB port in response to the reset command signal received by the auxiliary controller via the hub,
   wherein the auxiliary controller is connected between the hub and the USB port to independently operate the USB port separately from a secure digital (SD) slot provided to the integrated multimedia terminal, wherein SD data is received from the SD slot without conversion to USB protocols.

4. The method of claim 3, wherein the reset command signal for resetting the USB port is transmitted to the hub, and simultaneously, the reset command signal received by the hub is transmitted to the auxiliary controller.

5. A non-transitory computer readable medium containing program instructions executed by a controller, the computer readable medium comprising:
   program instructions that connect a universal serial bus (USB) to a USB port of an integrated multimedia terminal;
   program instructions that determine whether the USB port is activated;
   program instructions that transmit a reset command signal for resetting the USB port to an auxiliary controller via a hub when the USB port is inactivated;
   program instructions that determine an object to which the reset command for resetting the USB port is to be transmitted; and
   program instructions that reset and reactivate the USB port by supplying a bus voltage to the USB port in response to the reset command signal received by the auxiliary controller via the hub,
   wherein the auxiliary controller is connected between the hub and the USB port to independently operate the USB port separately from a secure digital (SD) slot provided to the integrated multimedia terminal, wherein SD data is received from the SD slot without conversion to USB protocols.

6. The non-transitory computer readable medium of claim 5, wherein the reset command signal for resetting the USB port is transmitted to the hub, and simultaneously, the reset command signal received by the hub is transmitted to the auxiliary controller.

* * * * *